May 30, 1939.    L. ZAIGER    2,160,246
WINDSHIELD WIPER
Filed March 1, 1934
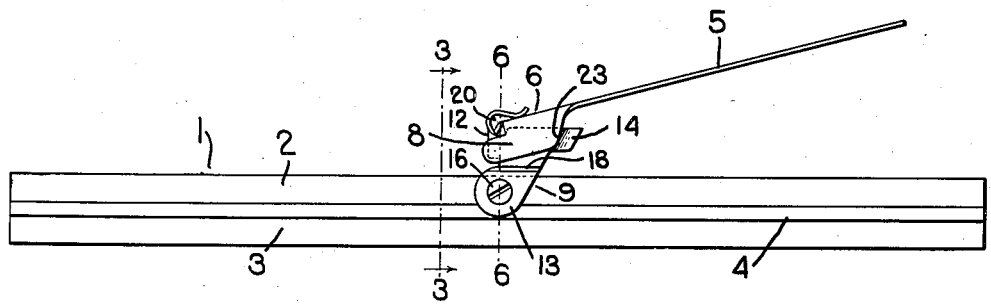
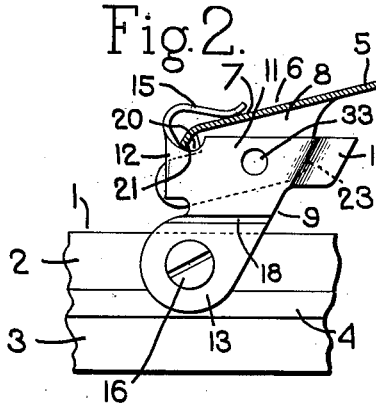 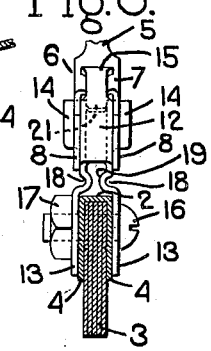 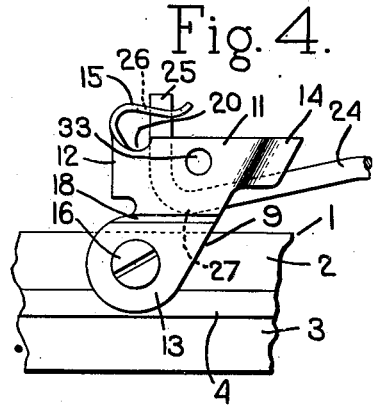
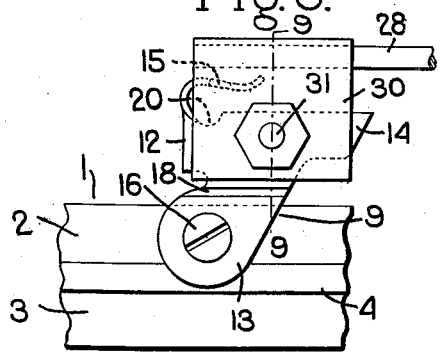 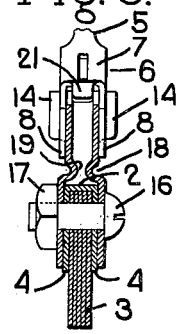 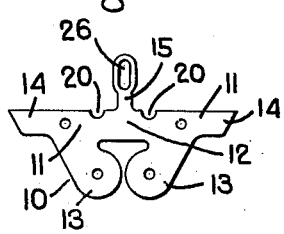
Inventor.
Louis Zaiger
by Heard Smith & Tennant.
Attys.

Patented May 30, 1939

2,160,246

UNITED STATES PATENT OFFICE 2,160,246

WINDSHIELD WIPER

Louis Zaiger, Lynn, Mass.

Application March 1, 1934, Serial No. 713,463

5 Claims. (Cl. 15—250)

This invention relates to windshield wipers for automobiles and particularly to the means for attaching the wiper blade to the wiper arm.

One of the objects of the invention is to provide an improved wiper blade attachment which is constructed so that the wiper blade can be readily applied to any one of the several different types of wiper arms that are now in common use. One type of wiper arm has a U shape at its end, another type of wiper arm is in the form of a rod having its end bent laterally thereby presenting a general L shape and still another type of wiper arm is formed at its end with two wings adapted to straddle the wiper blade.

My present invention provides a novel clip device adapted to be attached to the wiper blade and which is constructed so that it can be detachably connected to a wiper arm of any one of the above-mentioned types.

My improved clip is constructed with two spaced sides adapted to receive between them the L-shaped end of the rod type of wiper arm and also adapted to be received between the flanges of the U-shaped type. The clip is also provided with means to interlock with each type to prevent accidental displacement.

In order to give an understanding of the invention I have illustrated in the drawing a selected embodiment thereof which will now be described after which the novel features will be pointed out in the appended claims.

Fig. 1 is a view of a wiper blade showing it connected to the type of wiper arm having the U-shaped end;

Fig. 2 is an enlarged side view of the clip shown in Fig. 1 but with part of the wiper arm broken away;

Fig. 3 is a section on the line 3—3, Fig. 1;

Fig. 4 is a fragmentary view illustrating the wiper blade having my improved attaching means as applied to the L-shaped type of arm;

Fig. 5 is a similar view showing the blade having my improvements as applied to still a different type of wiper arm;

Fig. 6 is an enlarged section on the line 6—6, Fig. 1;

Fig. 7 shows the blank from which the clip is made;

Fig. 8 is a perspective view of the clip detached from the wiper blade;

Fig. 9 is a section on the line 9—9, Fig. 5.

My invention can be applied to wiper blades of different constructions. The wiper blade herein shown is indicated generally at 1 and it is of the known type comprising a holder member 2 of metal which is U-shaped in cross section and a plurality of flexible wiping strips 3, preferably of soft rubber, which are confined between the legs 4 of the holder. There is shown in Fig. 1 a wiper arm 5 of a type which is in common use, said arm being made of a strip of resilient metal and having the U-shaped end 6, said end presenting the flat seat portion 7 and the two depending ears or flanges 8.

The means for attaching the wiper blade 1 to the wiper arm 5 comprises a clip member indicated generally at 9, one form of which may conveniently be made from a blank 10 such as shown in Fig. 7. This blank is formed with the two body portions 11 connected by a bridge 12, each body portion having an ear 13 and an extension 14. The bridge portion 12 is also formed with a projection 15 extending therefrom and each body portion is formed with a notch 20.

In making the clip this blank is bent at the bridge portion 12 into a U shape so that the body portions 11 assume positions substantially parallel to each other but spaced apart from each other. The two ears 13 are designed to straddle the holder 2 of the wiper element 1 and are secured to the wiper element by any suitable means such for instance as a screw or rivet which passes through the ears and the wiper element. In the drawing I have shown a screw 16 for this purpose, said screw having a nut 17 screw threaded thereto to retain it in place.

When the blank 10 is bent to form the clip the body portions 11 of the blank constitute two parallel side portions of the completed clip. These side portions are shown as having grooves 18 formed in their exterior faces which extend in the direction of the length of the wiper element 1, said grooves providing corresponding ribs 19 on the inner faces of the side members 11 for a purpose which will be presently described.

The clip is constructed so that the two sides 11 fit between the flanges 8 of the U-shaped end 6 of the wiper arm 5 and one at least of the extensions 14 is formed with a projection which co-operates with the rear edges 23 of the flanges 8 to assist in retaining the clip attached to the holder. Such projection may be formed by deforming one or both of the extensions 14 in some suitable way as by striking up a portion of each extension or by bending one or both of the extensions outwardly as shown best in Fig. 8.

The projection 15 is preferably bent backwardly into the shape shown and is made somewhat resilient. Said projection co-operates with the end 21 of the arm 5 to assist in holding the arm and clip in their attached relation.

The clip may be attached to the arm 5 by inserting the end 21 of the arm underneath the resilient finger 15 and with the two flanges 8 of the arm embracing the sides 11 of the clip. When the arm has been inserted under the finger 15 into a position with the end 21 thereof occupying the notches 20 and the arm and wiper blade are in their operative positions the projection or projections formed by the wings 14 co-operate with the rear edge or edges 23 of the flanges 8 of the arm to prevent withdrawal of the clip from the arm in the direction of the length of the arm. The finger or projection 15 co-operates with the extremity of the arm 5 to prevent the arm from disengagement of the clip in a direction at right angles to the wiper blade. With this construction, therefore, the U-shaped end 6 of the wiper arm embraces the sides 11 of the clip, the projection formed by the extension 14 co-operates with the rear edge 23 of one of the flanges 8 and the projection 15 co-operates with the extremity of said arm 5 to limit relative movement between the arm and the clip in the direction of the length of the wiper blade, while the finger or projection 15 co-operates with the portion 6 of the arm 5 to prevent separation of the clip and the arm in a direction at right angles to the wiper blade. The wiper blade is thus securely retained on the wiper arm but the construction is such that the wiper blade can be readily detached or separated from the wiper arm in case it is necessary to replace it with a new wiper blade.

I have described above the construction of the clip and the manner in which it is attached to the wiper blade 5 having the U-shaped end. In Fig. 4 there is illustrated a different type of wiper blade 24 in the form of a rod having its end bent laterally as shown at 25. As stated above the clip is also adapted for use for attachment to this type of wiper arm and to provide for this the resilient retainer arm 15 is formed with an aperture 26 adapted to receive the bent end 25 of the arm 24.

In attaching a wiper blade having this improvement to the wiper arm 24 the end of the arm is inserted between the sides 11 of the clip and the bent end 25 of the arm is inserted through the aperture 26, the portion 27 of the arm 24 resting on the ribs 19. The spacing between the sides 11 is approximately the same as the diameter of the rod 24 so that said rod fits into this space and the aperture 26 has a transverse diameter substantially the same as the diameter of the end 25 of the arm 24. Since the portion 27 of the arm 24 fits between the two side portions 11 the clip will be securely attached to the arm but without any flopping or rocking motion between the clip and the arm.

In Fig. 5 there is shown still another form of wiper arm which comprises a rod 28 having a U-shaped attaching member secured thereto which is provided with the two sides or cheek pieces 30. In attaching the clip to this form of arm the clip is inserted between the two sides or cheek pieces 30 and an attaching bolt or screw 31 passes through the two cheek pieces 30 and either through the notches 20 or through the holes 33 with which the sides 11 of the clip are provided. If the attaching screw is inserted through the notches 20 the resilient finger 15 will serve to retain the screw in the notches.

The construction is such that when the clip is applied to any one of the wiper arms shown there will be no appreciable rocking movement between the clip and the wiper arm.

The clip is relatively simple in construction and is well adapted for use with any one of the three types of wiper arm illustrated.

I claim:

1. A windshield wiper comprising a wiping element, a clip secured thereto and by which it is attached to a wiper arm, said clip having two spaced sides adapted to fit between the side flanges of a wiper arm having a U-shaped attaching portion and also having a laterally-extending projection co-operating with the rear edge of one of said side flanges to limit relative movement between the clip and wiper arm in the direction of the length of the wiping element.

2. A windshield wiper comprising a wiping element, a clip secured thereto and by which it is attached to a wiper arm, said clip having two spaced sides adapted to fit between the side flanges of a wiper arm having a U-shaped attaching portion and also having a retaining portion co-operating with an edge of one of said side flanges to limit relative movement between the clip and the wiper arm in the direction of the length of the wiping element.

3. A windshield wiper comprising a wiper element, a clip secured thereto and by which it is attached to a wiper arm, said clip having two spaced sides adapted to fit between the side flanges of a wiper arm having a U-shaped attaching portion, and also having a laterally-extending projection to co-operate with the rear edge of one of the side flanges of the U-shaped attaching portion and further having a projection to co-operate with the extremity of said wiper arm, said projections limiting relative movement between the clip and wiper arm in the direction of the length of the wiper element.

4. A windshield wiper comprising a wiper element, a clip secured thereto and by which it is attached to a wiper arm, said clip having two spaced sides adapted to fit between the side flanges of a wiper arm having a U-shaped attaching portion and also having a laterally-extending projection to co-operate with the rear edge of one of the side flanges of the U-shaped attaching portion and further having a projection to co-operate with the extremity of said wiper arm, said projections limiting relative movement between the clip and wiper arm in the direction of the length of the wiper element, said clip further having means to overlie the back of the wiper arm to prevent accidental displacement in a direction at right angles to the length of the wiping element.

5. A windshield wiper comprising a wiping element, a clip by which said wiping element is attached to a wiper arm having a U-shaped attaching portion and a transverse lip at its end, said clip having a U-shaped body comprising two parallel legs and a connecting portion, means for attaching said clip to the wiping element with the legs extending in a direction parallel to the lengthwise direction of the wiping element and with the connecting portion at one end of the clip, the two legs constituting spaced sides adapted to fit between the side flanges of the U-shaped attaching portion of the wiper arm, each leg having a notch in its upper edge adjacent the connecting portion adapted to receive said lip and the connecting portion having a finger integral therewith extending backwardly over said attaching portion of the wiper arm, the free ends of the legs having lateral extensions engaging the attaching portion remote from said lip and assisting in retaining the operative connection between the clip and the arm.

LOUIS ZAIGER.